United States Patent [19]

Miller

[11] 4,094,557
[45] June 13, 1978

[54] COMBINATION LOW GROUND PRESSURE, LOW TURNING RESISTANCE AND SELF-CLEANING TRACK SHOE

[75] Inventor: Larry E. Miller, Bettendorf, Iowa

[73] Assignee: J. I. Case Company, Racine, Wis.

[21] Appl. No.: 733,521

[22] Filed: Oct. 18, 1976

[51] Int. Cl.² .............................................. B62D 55/28
[52] U.S. Cl. .................................................... 305/54
[58] Field of Search ..................... 305/54, 13, 53, 55, 305/39, 35 R

[56] References Cited

U.S. PATENT DOCUMENTS

| | | | |
|---|---|---|---|
| 3,278,244 | 10/1966 | Deffenbaugh et al. | 305/54 |
| 3,937,529 | 2/1976 | Becker et al. | 305/54 |

*Primary Examiner*—Robert B. Reeves
*Assistant Examiner*—John P. Shannon
*Attorney, Agent, or Firm*—Dressler, Goldsmith, Clement, Gordon & Shore, Ltd.

[57] ABSTRACT

A combination low ground pressure, low turning resistance, and self-cleaning shoe for an articulated endless track used on track-type vehicles is disclosed. The shoe is formed as a rigid body having a sloping forward planar surface and a sloping rearward surface which each run the length of the shoe and which substantially converge toward each other. Projecting from between the forward and rearward surfaces is a third surface, or traction lug. High-floatation planar bearing surfaces are located on each end of the body and each have a portion adjacent to, and of the same width as the traction lug but increase in width with increasing distance from the lug.

9 Claims, 4 Drawing Figures

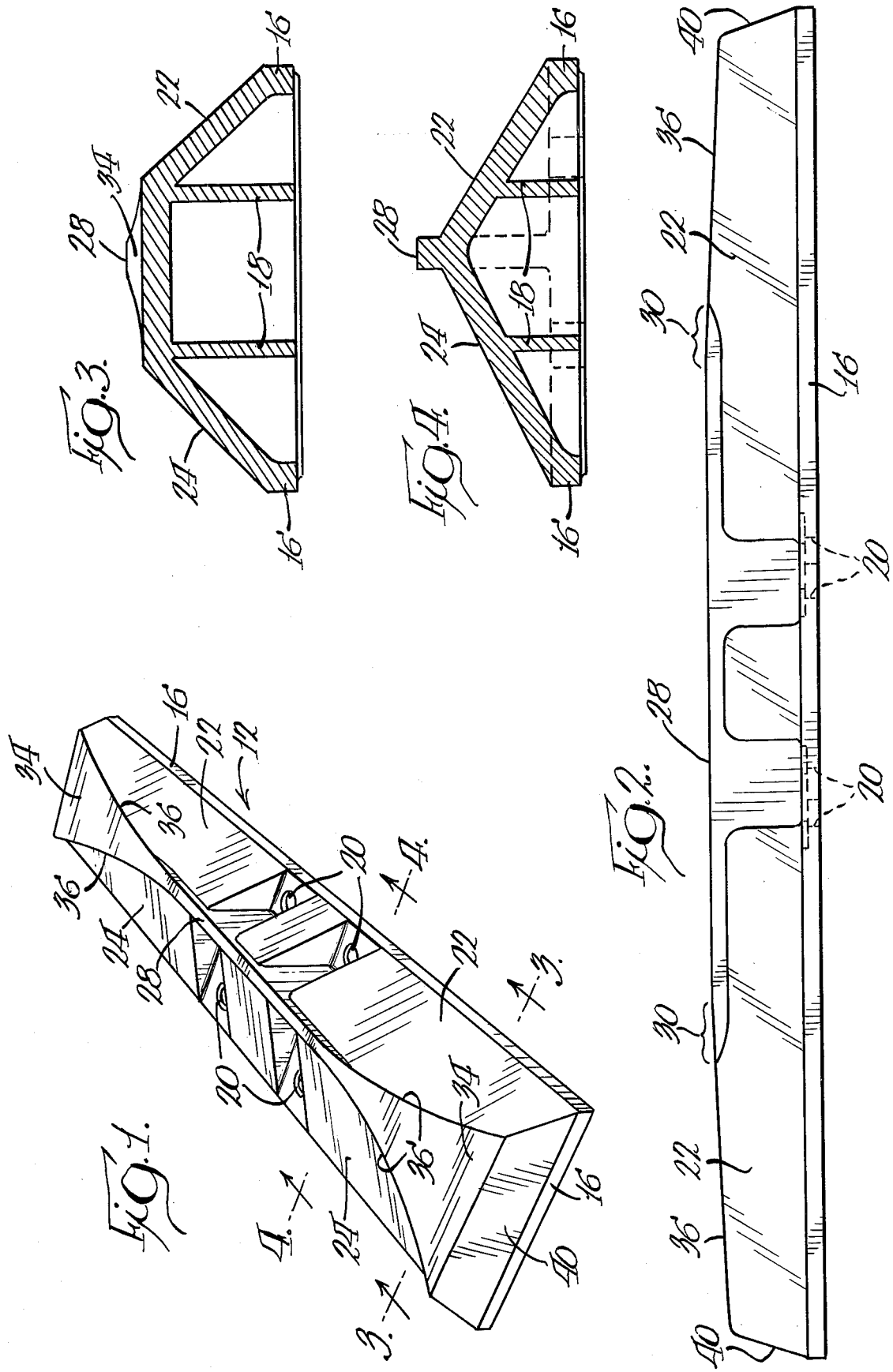

COMBINATION LOW GROUND PRESSURE, LOW TURNING RESISTANCE AND SELF-CLEANING TRACK SHOE

BACKGROUND OF THE INVENTION

This invention relates to the improvements in track shoes for track-type vehicles and particularly to low ground pressure shoes designed for use in medium-light or medium-wet soils.

Modifications to track shoes have been proposed to improve the floatation and traction capabilities in light or very wet soils. For a given width and length of a track shoe, a number of these modifications involve varying the shape of the ground contact surface of the shoe. Such modifications usually incorporate a protuberant traction face which has a generally V-shaped or triangular face for engaging the ground.

With some types of low ground pressure shoes, the V-shaped traction face is blunt enough or obtuse enough to provide good floatation in light soil, but suffers from not having sufficient projection depth to provide good traction.

On the other hand, some type of low pressure shoes may have a projecting traction ridge running the length of the shoe to provide traction. However, with such designs the turning resistance is necessarily greater due to the projecting ridge which is in engagement with the soil. Further, the space between the ridge and other parts of the shoe and/or adjacent shoes can fill and become compacted with mud or soil to the extent that the effectiveness of the traction ridge is much reduced.

It would be desirable to provide a low ground pressure shoe which, while presenting a large surface area to reduce ground pressure, would also incorporate a traction ridge member that provides a lower turning resistance as well as self-cleaning capability to prevent mud and soil from building up on the shoe and reducing the effectiveness of the design.

It has been found that some types of V-shaped or triangular type low ground pressure shoes suffer from the disadvantage of imparting intermittent shock loading to the track support structure or portions thereof. This is due to the fact that triangular type shoes have a projecting apex which is the first portion of the shoe to come into contact with the ground. Obviously, a triangular type shoe that must initially support the weight of a vehicle on its apex is unstable and will tend to rotate to one side or the other of the apex as the shoe sequentially passes beneath, and bears the weight of, each track roller. This is especially true when the track is operating on a hard surface.

The tendency of the shoe to rotate about the apex is, and must, be resisted by the particular members in the track (e.g., pins and links) to which the shoe is secured. During operation of the track, the shoes tend to rock about the apex so rapidly that the resulting moments and forces transferred to the track links and pins are actually in the nature of deleterious shock loadings. Such shock loadings can produce an undesirably high component wear rate. Thus, it would be desirable to provide a shoe which has the advantages of a triangular traction face yet does not generate high shock loads in the track components.

SUMMARY OF THE INVENTION

The track shoe of the present invention provides a traction face having a novel arrangement of protuberant surfaces which provide 1) a greatly increased surface area on the traction face to reduce ground pressure, 2) an integral traction lug for projecting into the light or wet soil but which is designed so that it also reduces greatly the turning resistance of the shoe and 3) a unique arrangement of smooth, planar surfaces with curved edges that function to effect self-cleaning of the shoe.

More specifically, in the preferred embodiment, a substantially hollow, reinforced rigid body having a generally protuberant traction face is provided with a number of facets or surfaces. Most of the facets or surfaces are inclined or slanted with respect to a flat rectangular base by which the shoe is mounted on the track.

In particular, a sloping forward planar surface and a sloping rearward planar surface run the length of shoe and substantially converge toward each other. An elongated traction lug, which projects from between the forward and rearward surfaces, is disposed above, and forward of, the center line of the base and midway between each end of the base.

On each end of the shoe is a planar bearing surface between the forward and rearward surfaces which each have a portion adjacent to, and of the same width as, the traction lug. Each planar surface flares outwardly from the lug and increases in width with increasing distance from the lug. Further, each bearing surface is sloped away from the lug towards the base of the shoe. A slanting end surface on each end of the shoe marks the termination of the planar bearing surface, as well as the termination of the forward and rearward surfaces.

With the multi-faceted protuberant traction face design of the present invention, a large overall surface area is presented which lowers the ground pressure. Further, the sloping nature of the many surfaces of the shoe affords little opportunity for soil or mud to build up on the shoe to an undesirable extent. Additionally, the slanting nature of the forward and rearward surfaces of the shoe afford little opportunity for mud or soil to stick or become compacted between adjacent shoes in the track. Moreover, the flared nature of the planar bearing surface provides a curved or elliptical edge at the top of the forward and rearward surfaces which provides a self-cleaning capability during turning operations.

Also, since the projecting traction lug does not extend to the ends of the shoe, since it merges with the planar bearing surfaces, and since each planar bearing surface is sloped away from the lug towards the base of the shoe, the shoe turning resistance is greatly reduced. To the extent that both planar bearing surfaces on either side of the traction lug slope away from the lug (and hence upwardly and away from the ground), the contact of the shoe with the ground is similar to the curved surface contact of a sphere with the ground. Thus, as it is easier to turn a sphere about an axis perpendicular to the ground than a flat plate it is also easier to turn the shoe of the present invention about an axis perpendicular to the ground.

To the extent that the planar bearing surfaces become wider at each end of the shoe, more stable support is provided as the shoe passes beneath, and bears the weight of, each track roller. This reduces any rocking tendency and substantially mitigates shock loadings on the track components.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a perspective view of the track shoe of the present invention;

FIG. 2 is a side elevational view of the track shoe of FIG. 1;

FIG. 3 is a cross-sectional view taken along line 3—3 of FIG. 1; and

FIG. 4 is a cross-sectional view taken along line 4—4 of FIG. 1.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

For ease of description, the apparatus of the invention will be described in normal operating position, and terms such as upper, lower, horizontal, etc., will be used with reference to this normal operating position. It will be understood, however, that apparatus of the invention may be manufactured, stored, transported and sold in orientation other than the normal operation position described.

The track shoe of the present invention is generally designated as 12 in FIG. 1. The track shoe may be solid but is preferably a substantially hollow, reinforced rigid body of steel or other suitable material and has a generally protuberant multi-faceted traction face rising from a base 16. The base 16 may be a solid plate extending across the bottom of the rigid body or may be merely defined by the termination of the perimetric walls that comprise the facets of the traction face. Preferably, reinforcing members 18 are provided to strengthen the hollow shoe 12.

Within portions of the base 16, are apertures 20 for receiving bolts (not shown) by which the shoe is secured to the track links (not shown). To provide a greater surface area and to thus effect a lower ground pressure, the protuberant traction face of the shoe has a number of sloping facets or surfaces which intersect at generally obtuse angles. Two of these surfaces extend substantially the entire length of the shoe and slope upwardly from each side edge. One of these is a forward planar surface 22 and the other is a rearward planar surface 24. Both surfaces 22 and 24 rise from base 16 and substantially converge toward each other.

Projecting from between the forward and rearward planar surfaces 22 and 24 is an elongated track traction lug 28. The traction lug 28 is slightly forward of the center line of the base 16, as illustrated in the cross-sectional views of FIGS. 3 and 4, and is disposed midway between each end of the shoe as best illustrated in FIGS. 1 and 2. The projection of the traction lug beyond the forward and rearward surfaces 22 and 24 obviously functions to dig further into the soft ground and provide a means of engagement of the shoe with the ground for withstanding the reaction thrust force as the vehicle moves forward. Though the traction lug 28 is shown as having a central flat surface, it could be curved or arched outwardly from the shoe.

The traction lug 28 is uniquely designed to curve, or slope, near each end 30 (as best illustrated in FIG. 2) and to, in a continuous, uninterrupted manner, merge with high-floatation planar bearing surfaces 34. The bearing surfaces 34 continue sloping down from the top of the lug 28 towards the base 16. Further, though a portion of each planar bearing surface 34 adjacent the lug end 30 is the same width as the lug 28, each planar bearing surface 34 flares outwardly from the lug, increasing in width with increasing distance from the lug. Consequently, at the end of the shoe, the planar bearing surface 34 is considerably wider than the lug 28. The increased width of the planar bearing surfaces 34 provide a means for effecting reduced ground pressure and thereby provide a high-floatation effect. Also, the planar bearing surfaces provide more stable support of the shoe as it passes beneath, and bears the weight of, each track roller. This reduces the tendency of the shoe to rock and consequently reduces shock loading on the track components. It is important to note also that because the planar bearing surfaces slope towards the base 16 (hence, upwardly and away from the ground) on each side of the lug 28, the effectiveness of lug 28 as ground engaging traction device is not diminished.

During turning operations, resistance to such turning is greatly reduced by the fact that the bearing surfaces are rising upwardly and away from the ground on each end of the shoe. Thus, the profile of ground contact of the shoe of the present invention is similar to that of the profile of a sphere in contact with the ground. In this respect, the resistance to rotation of the shoe about an axis perpendicular to the ground is reduced (with respect to a flat, non-sloping shoe) in much the same manner that the resistance to rotation of the sphere about an axis perpendicular to the ground is less when compared to a flat plate.

Since each planar bearing surface 34 is formed, essentially, from a sloped plane that intersects the forward and rearward planar surfaces 22 and 24, curved edges 36 are necessarily formed at those intersections. The edges 36, when combined with the sloping forward and rearward planar surfaces 22 and 24, provide a self-cleaning capability. During vehicle turning operations, mud or compacted soil will have a tendency to slide along these sloping surfaces and the edges 36. Note also that there are no right angle corners or crevises in or between the surfaces of the shoe (except for the bolt hole areas) in which the mud or soil can build up, stick, or become compacted.

Each end of the shoe 12 has an end surface 40 that terminates on one edge at the planar bearing surface 34, on two other edges at the forward and rearward planar surfaces 22 and 24, and on the bottom edge at the base 16. The end surface 40 preferably slants inwardly towards the center of the shoe with increasing shoe height.

Owing to the slanted and sloping orientation of the surfaces of the track face, there is little opportunity for mud or soil to stick between or become compacted between adjacent shoes in a track. Thus, as the shoe is lifted away from ground contact and passes around the rear drive wheel of the track, mud or soil will easily tend to fall away from between the shoes.

Though the surfaces of the protuberant traction face are illustrated as being sloping planar surfaces, gently curving surfaces may also be used with advantage. Of course, such surfaces would be somewhat more difficult to manufacture.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A combination low ground pressure, low turning resistance, and self-cleaning shoe for an articulated endless track used on track-type vehicles comprising:
    a body having a sloping forward surface and a sloping rearward surface, each said forward and rearward surface substantially converging toward the other;
    a traction lug projecting from said body between said forward and rearward surfaces and terminating at opposite ends at locations spaced from opposite ends of said body; and
    a high-flotation bearing surface on each end of said body between said forward and rearward surfaces, each said bearing surface having a portion adjacent to, and of the same width as said lug and each said bearing surface increasing in width with increasing distance from said lug toward an adjacent end of said body, each of said bearing surfaces sloping away from said lug toward the adjacent end of said body.

2. The shoe in accordance with claim 1 in which said forward and rearward surfaces are substantially planar.

3. The shoe in accordance with claim 1 in which said lug presents an arcuate surface having a high point midway between the ends of said body.

4. The shoe in accordance with claim 1 in which said lug and said bearing surfaces are integral with said body and present one continuous, uninterrupted support surface.

5. The shoe in accordance with claim 1 further including an end surface on each end of said body, said end surface being defined on one edge by said bearing surface and on two other edges by said rearward and forward surfaces.

6. The shoe in accordance with claim 5 in which said end surface is substantially planar.

7. The shoe in accordance with claim 1 in which said bearing surfaces are substantially planar.

8. The shoe in accordance with claim 7 in which two opposite edges of each said bearing surface are defined by the intersections of the plane of each bearing surface with said forward and rearward surfaces.

9. A combination low ground pressure, low turning resistance, and self-cleaning shoe for an articulated endless track used on track-type vehicles comprising:
    a substantially hollow, reinforced rigid body having a generally protuberant traction face and a substantially rectangular base means for supporting the body in said endless track;
    said traction face having a sloping forward planar surface and a sloping rearward planar surface, each said forward and rearward surface substantially converging toward the other;
    said traction face further having an elongated traction lug projecting from said body between said forward and rearward surfaces, said lug being disposed a) above, and forward of, the center line of said base means and b) midway between each end of said base means; and
    said traction face further having a high-floatation planar bearing surface on each end of said body between said forward and rearward surfaces, each said planar bearing surface having a portion adjacent to, and of the same width as said lug, each said planar bearing surface flaring outwardly from said lug with increasing width, and each said planar bearing surface further sloping from said lug towards said base means.

* * * * *